(12) United States Patent
Baram

(10) Patent No.: US 10,893,080 B2
(45) Date of Patent: *Jan. 12, 2021

(54) RELAYING MULTIMEDIA CONFERENCING UTILIZING SOFTWARE DEFINED NETWORKING ARCHITECTURE

(71) Applicant: Polycom, Inc., San Jose, CA (US)

(72) Inventor: Lior Baram, Kfar-Saba (IL)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,133

(22) Filed: Nov. 12, 2019

(65) Prior Publication Data

US 2020/0084248 A1 Mar. 12, 2020

Related U.S. Application Data

(63) Continuation of application No. 15/221,325, filed on Jul. 27, 2016, now Pat. No. 10,516,704.

(60) Provisional application No. 62/197,844, filed on Jul. 28, 2015.

(51) Int. Cl.
*H04L 29/06* (2006.01)

(52) U.S. Cl.
CPC ........ *H04L 65/1069* (2013.01); *H04L 65/403* (2013.01); *H04L 65/605* (2013.01); *H04L 65/80* (2013.01)

(58) Field of Classification Search
CPC . H04L 65/1069; H04L 65/605; H04L 65/403; H04L 65/80
See application file for complete search history.

(56) References Cited

U.S. PATENT DOCUMENTS

| | | |
|---|---|---|
| 2003/0182374 A1 | 9/2003 | Haldar |
| 2006/0223510 A1 | 10/2006 | Takeda et al. |
| 2007/0250567 A1* | 10/2007 | Graham ................. H04L 12/18 709/204 |
| 2008/0063173 A1 | 3/2008 | Sarkar et al. |
| 2011/0153842 A1 | 6/2011 | Chuang et al. |
| 2014/0132701 A1 | 5/2014 | Wang et al. |

(Continued)

OTHER PUBLICATIONS

Open Network Foundation, "Real Time Media NBI Rest Specification," Version 1.0 TR-517, Mar. 2015, 71 pages.

*Primary Examiner* — Nicholas R Taylor
*Assistant Examiner* — Tania M Pena-Santana
(74) *Attorney, Agent, or Firm* — Keith Lutsch PC

(57) ABSTRACT

Various embodiments for implementing a multimedia conference session utilizing a software defined networking (SDN) architecture are described. Various embodiments include an SDN media controller (SDNMC) that initially receives a request to establish a multimedia conferencing session between a plurality of endpoints. Based on the request, the SDNMC allocates at least one virtual media address for the multimedia conferencing session and creates a stream table based on the at least one virtual media address. After processing the request, the SDNMC transmits one or more SDN commands that includes the stream table to the SDN controller. The SDN controller receives the SDN commands at a northbound interface and sends one or more SDN instructions to one or more SDN devices at a southbound interface. The SDN devices update their routing information in order to relay media traffic corresponding to the virtual media address directly between the endpoints.

15 Claims, 8 Drawing Sheets

(56) References Cited

U.S. PATENT DOCUMENTS

| | | | |
|---|---|---|---|
| 2014/0267577 A1* | 9/2014 | Weber | H04L 12/1822 |
| | | | 348/14.09 |
| 2014/0280595 A1 | 9/2014 | Mani et al. | |
| 2015/0062285 A1* | 3/2015 | Xu | H04L 12/1822 |
| | | | 348/14.08 |
| 2015/0103136 A1 | 4/2015 | Anderson et al. | |
| 2015/0334716 A1 | 11/2015 | Coffman | |
| 2018/0039473 A1* | 2/2018 | Kim | H04L 12/1827 |

\* cited by examiner

RELAYING MULTIMEDIA CONFERENCING UTILIZING SOFTWARE DEFINED NETWORKING ARCHITECTURE

CROSS REFERENCE TO RELATED APPLICATIONS

This application is a continuation of U.S. patent application Ser. No. 15/221,325, entitled "Relaying Multimedia Conferencing Utilizing Software Defined Networking Architecture," filed Jul. 27, 2016, which claims priority to U.S. Provisional Application No. 62/197,844, entitled "System and Method for Relaying Videoconferencing Media, Utilizing Software Defined Networking (SDN) Architecture," filed Jul. 28, 2015, which are both hereby incorporated by reference.

TECHNICAL FIELD

Embodiments described herein generally relate to multimedia conferencing over a network system, and more particularly for videoconferencing that utilizes a Software Defined Networking (SDN) environment.

BACKGROUND

Today's telecommunication technology continues to migrate the implementation of everyday applications and services onto computing networks, such as Internet Protocol (IP) networks. For instance, more and more users rely on multimedia conferencing that transports media data over computer networks using a variety of conferencing methods. A few examples of different types of conferencing methods include, but are not limited to Advance-Video Compression (AVC) multimedia conferencing, media relay conferencing (MRC), and mesh conferencing. In both AVC multimedia conferencing and MRC, a central entity (e.g., a traditional multipoint control unit (TMCU) or a media relay multipoint control unit (MRM), respectively) may manage the communication of control signals, audio media streams, and video media streams between one or more network devices. Each of the endpoints of a multimedia conference sends its media streams to the central entity that subsequently processes the media streams according to the type of communication method. The central entity then transfers the relevant media streams to the proper receiving endpoints. Alternatively, in mesh conferencing, no central entity may manage the different media streams. Instead, the mesh conferencing method may use a Roster List Server (RLS) as a central signaling entity and have the endpoints transmit and receive media streams directly from each other.

A multimedia conferencing session, such as a videoconferencing session, typically utilizes a sizeable amount of network resources to connect participants at different endpoints. For example, a multimedia conferencing session may need a relatively low latency and enough bandwidth to provide a real time experience for the participants. Further, a multimedia conferencing session may synchronize media streams (e.g., audio, video, and other media data) obtained from one or more endpoints. A multimedia conferencing session, for example, may match the different types of media and lip synchronization for audio and video streams obtained from participants at different endpoints. To synchronize media streams from multiple participants, a multimedia conferencing session may also attempt to limit the latency differences over the communication links. Additionally, if video data packets are lost in transmission, the decoded video may suffer from artifacts that may be repaired in order to maintain acceptable quality. Thus, missing data packets may lead to requesting Intra frames that can reduce a user experience (e.g., breathing effect) and increase bandwidth consumption.

In addition to allocating enough network resources, media conferencing methods generally involve a degree of network flexibility in order to adapt the media traffic to a variety of dynamic factors associated with a multimedia conferencing session. Typically, a multimedia conferencing session may be a dynamic session that varies traffic load over network links that carry the media streams. The dynamic nature of the multimedia conferencing session can originate from a variety of factors that include joining or leaving the session, changes in speakers, and changes in the presented images and mix audio. The different dynamic factors in the end often affect the routing of the different media streams and the addition or removal of network resources during the multimedia conferencing session. As such, improving media conferencing technology that is flexible in allocating network resources and capable of controlling and routing media streams according to the varying amounts of data traffic remains valuable as media conferencing becomes more popular.

SUMMARY

The subject matter described above is not intended to limit the scope of the present disclosure in any manner, and instead is presented above for illustration purposes. It should be understood at the outset that illustrative implementations of one or more embodiments are provided below and may be modified within the scope of the appended claims along with their full scope of equivalents.

In one embodiment, the disclosure includes an SDN-adapted media controller (SDNMC) that comprises a first network interface that receives a request to establish a multimedia conferencing session between a plurality of endpoints. An SDNMC manager receives the request and allocates at least one virtual media address for the multimedia conferencing session advertised by the SDNMC and creates media session information for the multimedia conferencing session based on the virtual media address. The SDNMC then transmits one or more SDN commands that includes the media session information to an SDN controller such that media streams communicated in the multimedia conferencing session are directly sent between the endpoints.

In another embodiment, the disclosure includes a method for implementing multimedia conferencing within an SDN environment. The method initially receives a request to establish a multimedia conferencing session between a plurality of endpoints. Based on the request, the method allocates a virtual media address for the multimedia conferencing session advertised by the SDNMC and creates media session information for the multimedia conferencing session based on the virtual media address. The method transmits one or more SDN commands that includes the media session information to an SDN controller such that media streams communicated for the multimedia conferencing session are directly sent between the endpoints.

In yet another embodiment, the disclosure includes a network component that receives a request to establish a multimedia conferencing session between a plurality of endpoints. The network component manages the signaling and control information sent from the endpoints. Once receiving the request to establish a multimedia conferencing session, the network component allocates at least one virtual media address for the multimedia conferencing session advertised to the endpoints and creates a stream table based on the virtual media address. The stream table may be created from information obtained from an IP address transforming table that relates to the multimedia conferencing session. To update routing tables in SDN-compliant devices that transport media streams for the multimedia conferencing session, the network component transmits SDN commands that include the stream table to an SDN controller. The SDN controller uses the stream table to create routing information that relays media traffic corresponding to the virtual media address directly between the endpoints via one or more SDN-complaint network devices.

In yet another embodiment, the disclosure includes a system that includes an SDNMC that is communicatively coupled to an SDN controller. The SDNMC initially receives a request to establish a multimedia conferencing session between a plurality of endpoints. Based on the request, the SDNMC allocates at least one virtual media address for the multimedia conferencing session advertised to the endpoints and creates a stream table based on the at least one virtual media address, wherein the stream table comprises media session information relating to the multimedia conferencing session. After processing the request, the SDNMC transmits one or more SDN commands that include the stream table to the SDN controller. The SDN controller receives the SDN commands at a northbound interface and sends one or more SDN instructions based on the SDN commands to one or more SDN devices at a southbound interface. The SDN instructions include routing information that relays media traffic corresponding to the virtual media address directly between the endpoints.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF EMBODIMENTS

Figure 1:
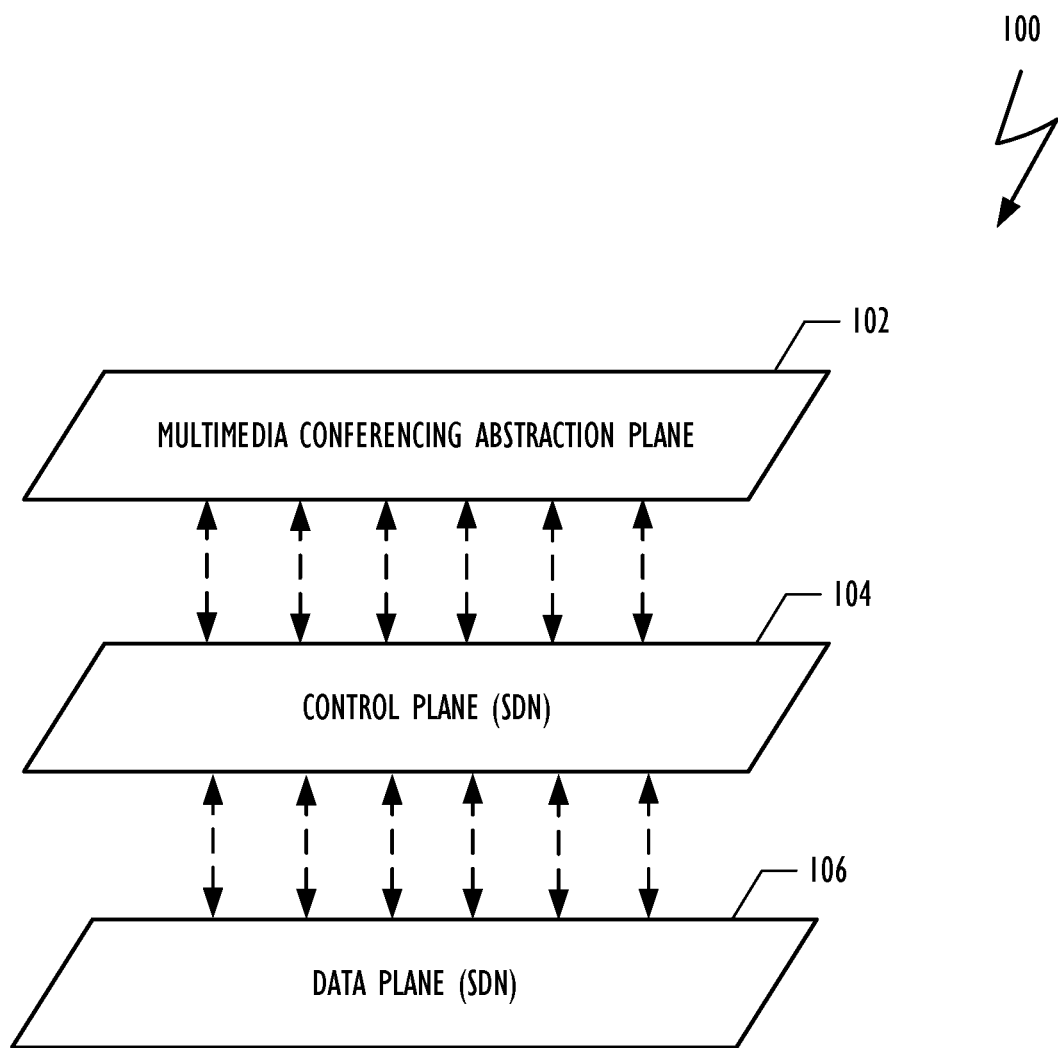
FIG. 1 illustrates an embodiment of a multimedia conferencing network architecture where embodiments of the present disclosure may operate herein.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computing system" can refer to a single electronic computing device that includes, but is not limited to a single computer, endpoint, terminal, host, virtual machine (VM), server, network device, mobile device, and/or smart device, or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "multimedia conference" refers to a call involving two or more parties that incorporate not only audio and/or video, but also other media such as text, graphics, and whiteboarding. Text could also include captioning, which is useful for accessibility, such as for the hearing impaired. Unless otherwise specified, the term "multimedia conference" may be interchanged and considered synonymous throughout this disclosure with the terms "video conference" (with or without content) and "audio conference."

As used herein, the term "endpoint" may represent a system used by a participant during a multimedia conference that transmits and receives media streams. Non-limiting examples of endpoints include traditional endpoints (TEPs), media relay endpoint (MREs), and/or mesh conferencing system endpoints (MCSEPs).

As used herein, the term "channel" refers to a connection used to transport a multimedia stream between two endpoints and/or network devices. In one embodiment, a channel can be bi-directional, such as videoconferencing channels that use User Datagram Protocol (UDP) and/or Real-time Transport Protocol (RTP).

In one embodiment, a multimedia conference between multiple participants may use a TMCU as a conference controlling entity that is typically located in a node of a network or in a terminal. The TMCU may receive several channels from a plurality of endpoints. According to certain criteria, the TMCU processes audio and visual signals and distributes them to each of the participating endpoints via a set of connected channels. A terminal in an AVC-communication method, which may be referred to as a TEP, is an entity on the network capable of providing real-time, two-way audio and/or audio visual communication with another TEP or with the TMCU. Examples of TEPs and TMCUs can be found within the International Telecommunication Union ("ITU") standards, such as the H.320, H.324, and H.323 standards.

The TMCU may include a plurality of audio and video decoders, encoders, and media combiners (e.g., audio mixers and/or video image builders) to handle audio and video communication between a variable number of participants at different TEPs. The communication between TEPs and TMCU can be based on a variety of communication protocols and compression standards and may involve different types of TEPs. The TMCU may also combine a plurality of input audio and/or video streams into at least one single output stream of audio and/or video that is compatible with the properties of at least one of the participant's TEP. The TMCU may decode and analyze compressed audio streams received from the TEPs to determine which audio streams to select for mixing into the single audio stream of the multimedia conference. Unless otherwise specified, the term "decode" and may be interchanged and considered synonymous throughout this disclosure with the term "decompress."

The TMCU may have one or more video output media streams per multimedia conference, wherein each output stream is associated with a layout. A layout defines the appearance of a multimedia conference on a display of one or more participants that receive the media stream. A layout may be divided into one or more segments, where each segment may be associated with a video input stream that is sent by a certain participant via the TEP. The TMCU may construct each output stream using several input streams, resulting in a continuous presence (CP) image. In a CP conference, a user at a remote terminal can simultaneously observe several other participants in the conference. Each participant may be displayed in a segment of the layout, and each segment may be the same size or a different size. The choice of the participants displayed and associated with the segments of the layout may vary among different conferees that participate in the same session.

In another embodiment, a MRC system may include one or more MRMs, where each MRM acts as a multipoint controller unit (MCU) that receives one or more media streams from each participating MRE. An MRM relays to one or more participating MREs a set of multiple media streams received from other MREs in the conference and/or from another MRM (e.g., media streams that originate from an MRM). Each receiving media relay endpoint uses the set of the multiple streams to generate the video CP image according to a layout, as well as mixed audio of the conference. The receiving MRE plays the CP video image and the mixed audio to a participant of the multimedia conference. In other words, an MRE can be a terminal of a participant in a multimedia conferencing session that has the ability to receive relayed media from an MRM and deliver compressed media according to instructions from an MRM.

In some MRC systems, a transmitting MRE may send video image in two or more media streams, where each media stream can be associated with different quality level. The quality levels of a media stream may be based on a variety of quality metrics that include, but are not limited to frame rate, resolution, and/or signal to noise ratio (SNR). For video streams, for example, the quality can be expressed in a number of domains, such as temporal domain (e.g., frames per second), spatial domain (e.g., high definition (HD) or common intermediate format (CIF)), and/or in video quality (e.g., sharpness). Another example of quality level for a media stream may be based on the compressing bit rate. Video compression standards that can be used for compressing multi-quality streams include H.264 Advanced Video Coding, H.264 annex G (scalable video coding (SVC)), and Moving Picture Experts Group-4 (MPEG-4). The benefit of having media streams associated with different quality levels is that multiple media streams may have different segment sizes in the layouts and/or different resolutions used by each receiving MRE. Another benefit for having multiple media streams is to overcome packet loss.

In another embodiment, a network operator may utilize a mesh conferencing system (MCS) to implement multimedia conferences. Rather than using a central entity, such as a TMCU and MRM, an MCS does not use a central entity for handling the media streams. Instead, in an MCS, a RLS can act as central signaling entity and endpoints within the MCS can send and receive the media directly from each other. In one embodiment, an endpoint can use a Web Real-Time Communication (WebRTC) application program interface (API). A common WebRTC may use a VP8 codec for video and an Opus codec for audio. Other embodiments of a MCS may use other web clients and other compression standards in order to deliver mesh conferencing services.

A common RLS can store a directory for a plurality of virtual meeting rooms (VMRs). Each VMR can represent a multimedia conferencing session this is associated with a VMR identification (VMRID), where each VMR may be associated with or without password. In some MCSs, each VMR may have a different uniform resource locator (URL) or uniform resource identifier (URI). Further, a VMR may comprise a list of endpoints already connected to the VMR. In the list, each endpoint is associated with one or more URLs that allow other participants to contact the VMR. Each URL can be associated with a media type or signaling. In a common MCS, the RLS may create a RLS list, which may also be referred to as an RLS state table, in real time starting from the first participant that called the VMR and subsequently updating the RLS list each time a new participant joins the VMR or a current participant leaves the VMR.

When a participant wishes to join a mesh multimedia session, the participant may use a web client to contact a VMR stored in a RLS using a browser application and clicking on the URL provided in the meeting invitation. The RLS may start an authentication process and, upon completion, an MCSEP may download a file, such as a HyperText Markup Language 5 (HTML5) file or JavaScript file, to the browser application running at the mesh conferencing endpoint. The browser application can parse the file (e.g., HTML5 file) and download a list of URLs of the participants that are already associated with that virtual meeting room. In addition, a RLS Web client (RLSWC) can be deployed from the RLS to the requesting browser application. The RLSWC can comprise a logical module for establishing the real-time session. When the MCSEP employs the RLSWC, the MCSEP can establish the signaling and control connections with the other browser applications and conduct the mesh multimedia conferencing.

In some cases, the RLS may also transfer a VMR state table to a new participant. The VMR state table can include information on the conferees that are already participating in the multimedia conferencing session. Afterwards, the new participant may establish a multimedia conferencing session with each of the other MCSEP by establishing a signaling and control connection. The new participant may establish a multimedia conferencing session using a communication protocol, such as Session Initiation Protocol (SIP) or H.323 protocol. Then each MCSEP may establish one or more Secure RTP (SRTP)/IP and Secure Real-Time Control Protocol (SRTCP)/IP connections for sending its video image and audio stream to each of the other participating MSCEP and for receiving video image and audio stream from each of the other participating MSCEP. Each time a participant leaves the session, the RLS can update the VMR state table accordingly and supply a copy of the VMR state table to each of the currently connected participants, informing them on the latest change. In one embodiment, the RLS may send the entire updated VMR state table to the participating MSCEP, while in another embodiment, the RLS sends portions of the VMR state table that include only the latest changes.

This disclosure includes various example embodiments that distribute media for multimedia conferencing amongst one or more network devices. In one embodiment, a multimedia conferencing network infrastructure may utilize and adapt an SDN environment to manage dynamic changes of multimedia conferencing conditions. By adapting the SDN environment, a multimedia conferencing network infrastructure may directly program network controls according to multimedia conferencing and current session needs, and dynamically adjust network-wide traffic flow to meet changing needs. The multimedia conferencing network infrastructure may utilize an API, such as the OpenFlow protocol, to communicate between the control plane and the data plane of the SDN environment. The multimedia conferencing network infrastructure may include one or more software-based SDN controllers that manage the SDN environment centrally. Each SDN controller maintains a global view of the network and provides to media controllers a point of access for one or more network resources. By doing so, the multimedia conferencing network infrastructure may minimize the use of specialized, central equipment, and instead rely on general network devices that are compliant with SDN. The multimedia conferencing network infrastructure may also include adaptors, which are relatively small translation processing units, instead of using a relatively large MCU in a central location.

FIG. 1 illustrates an embodiment of a multimedia conferencing network architecture 100 where embodiments of the present disclosure may operate herein. The multimedia conferencing network architecture 100 may employ an SDN architecture to provide scalability and manage dynamic changes of conditions for one or more computing applications. Specifically, the multimedia conferencing network architecture 100 may utilize the SDN architecture to route one or more media streams from source endpoints to the appropriate destination endpoints that participate in a multimedia conferencing session. The SDN may route the media streams based on dynamic variations associated with multimedia session and the media traffic load traversing along different network links. By dynamically allocating network resources for media conferencing, the multimedia conferencing network architecture 100 may be easily scalable and not limited by static deployments, such as providing MCUs in a centralized location.

The multimedia conferencing network architecture 100 may comprise multiple abstraction planes, a multimedia conferencing abstraction plane 102, a control plane 104, and a data plane 106. As shown in FIG. 1, the multimedia conferencing abstraction plane 102 may be a top abstraction plane that provides the media and controls of a multimedia conferencing system. The multimedia conferencing abstraction plane 102 may include endpoints, such as MREs, TEPs, and MCSEPs. FIG. 1 also illustrates that other abstraction planes, such as the control plane 104 and data plane 106, create the SDN architecture. The control plane 104 determines where to send media data to using a southbound API and/or framework, such as a southbound API and/or framework based on the OpenFlow protocol. The data plane 106 comprises the network devices that carry and forward media data, and comply with the southbound API and/or framework. By utilizing the SDN architecture, the multimedia conferencing network architecture 100 decouples network control and forwarding functions in order for network controls to become directly programmable and the underlying infrastructure to be abstracted from applications and network services.

In one or more embodiments, a network operator may also configure the multimedia conferencing abstraction plane 102 to handle at least a portion of the SDN commands. For example, if one or more endpoints associated with an AVC conferencing method (e.g., TEPs) and/or endpoints associated with a MCS conferencing method (e.g., MCSEPs) also participate in a certain multimedia session, then multimedia conferencing abstraction plane 102 may include one or more adaptor network devices. The adaptor network devices may translate the audio, video and other types of signaling associated with AVC or MCS endpoints to MRC operations and/or vice versa. In one embodiment, the multimedia conferencing abstraction plane 102 may dynamically allocate one or more adaptors at a central premise. The allocation of the network resources that the adaptor utilizes for translation between different endpoints may be implemented using SDN commands. Additionally or alternatively, a network operator may distribute and associate one or more adaptors with the relevant TEP or MCS endpoint (MCSEP).

The multimedia conferencing abstraction plane 102 may also comprise an SDNMC that manages signaling and control information from the endpoints and the media conference life cycle. The SDNMC can also determine which endpoints to send media streams (e.g., audio, video, and content data) when creating the media conference. In one embodiment, the SDNMC can base the routing on the type of layout presented at each of the endpoints. In other embodiments, the SDNMC may adapt the routing based on a user's request to view a particular media stream and/or a particular quality version of the media stream. Based on the information collected from the endpoints, the SDNMC can also send instructions to the control plane 104, such as to an SDN controller, in order to adapt the routing of media data and signaling toward the appropriate endpoints.

Additionally or alternatively, another embodiment of the SDNMC can determine the routing path based on the quality of each media stream. For example, the SDNMC may obtain an indication of the audio energy (e.g., audio energy metadata) related to each of the transmitted audio from each of the endpoints. In one embodiment, the endpoints may compute the audio energy rather than receiving this information from a MCU (e.g., MRM) and/or some other network device. The endpoint may send the audio energy information directly to the SDNMC or may send one or more identifiers that indicate if a user at the endpoint is speaking and/or if the endpoint detects music. For example, the endpoint may utilize a single bit to indicate a user at the endpoint is speaking (e.g., set the bit value to a logic "1" when user is speaking) and a separate output bit when the endpoint detects music (e.g., set the bit value to a logic "1" based on the detection of music). After obtaining the audio energy and/or information related to the audio energy, the SDNMC may accordingly change the routing of the different audio and/or video streams based on the audio energy and/or information related to the audio energy. As used herein, the term "audio energy" represents an audio level that is indicative of an audio volume corresponding to one or more speakers and/or music. In on embodiment, the audio energy may be an estimate of volume level of the speech and/or music after removing background noise.

In contrast to other network infrastructures that avoid dedicated, centralized network devices for multimedia conferencing, having an SDNMC that manages signaling and control information from the endpoints may allow the multimedia conferencing network architecture 100 to provide multimedia conferencing services between the endpoints even for networks that implement federated deployments and/or business-to-business use cases. Furthermore, utilizing an SDNMC may provide participant authentication and secure media conference session that are commonly required in networks, such as enterprise networks. For example, an enterprise network may not utilize an IP broadcast implementation where each source endpoint broadcasts media streams to a broadcast group because no centralized entity is able to authenticate the multimedia conference participants. By having the SDNMC send instructions to the control plane 104 (e.g., to an SDN controller) to route media streams between endpoints also reduces the number of specialized and dedicated network devices for receiving and properly managing the media streams.

In one embodiment, the instructions sent from the multimedia conferencing abstraction plane 102 to the control plane 104 may comprise an IP address transforming table (IPATT). In an embodiment of the IPATT, each row of the table can be associated with a media stream. The columns may comprise the media stream identifier (ID), the required quality of service (QoS), the SDNMC requested IP address of the transmitting endpoint, and the one or more destination addresses of the endpoints that receive the identified media stream. In an embodiment, a deep packet inspection (DPI) server and/or other network device may collect information relating to the IPATT and provide the information to the SDNMC. Each of the endpoints and the SDNMC within the multimedia conferencing abstraction plane 102 may inform the relevant SDN devices located in the control plane 104 and/or data plane 106 about their IP addresses. Examples of the SDN devices include, but are not limited to routers, switches, gateway, gatekeepers, and/or network devices that are communicatively coupled to the endpoints and the SDNMCs. To provide instructions to the control plane 104, the multimedia conferencing abstraction plane 102 may include one or more SDN APIs, where each SDN API handles a compressed media stream and to translate the relevant row of the IPATT for an SDN controller located in the control plane 104.

FIG. 1 illustrates that the control plane 104 is a middle abstraction plane and the data plane 106 is the lowest abstraction plane of the multimedia conferencing network architecture 100. The control plane 104 may comprise one or more SDN controllers that use one or more northbound APIs to communicate with one or more network devices in the multimedia conferencing abstraction plane 102, such as the SDNMC. In order to communicate with the network devices in the data plane 106, such as switches and router, the control plane 104 may use a protocol, such as the OpenFlow protocol, and/or rely on a framework such as the "Open Daylight Project" software suite. An SDN controller within the control plane 104 can respond to instructions received from the SDNMC or the endpoints in the multimedia conferencing abstraction plane 102 and accordingly manage the network connections within the data plane 106. The data plane 106 may comprise network devices that comply with SDN protocols, such as OpenFlow. Non-limiting examples of network devices located within the data plane 106 may comprise switches, routers, and/or firewalls.

Figure 2:
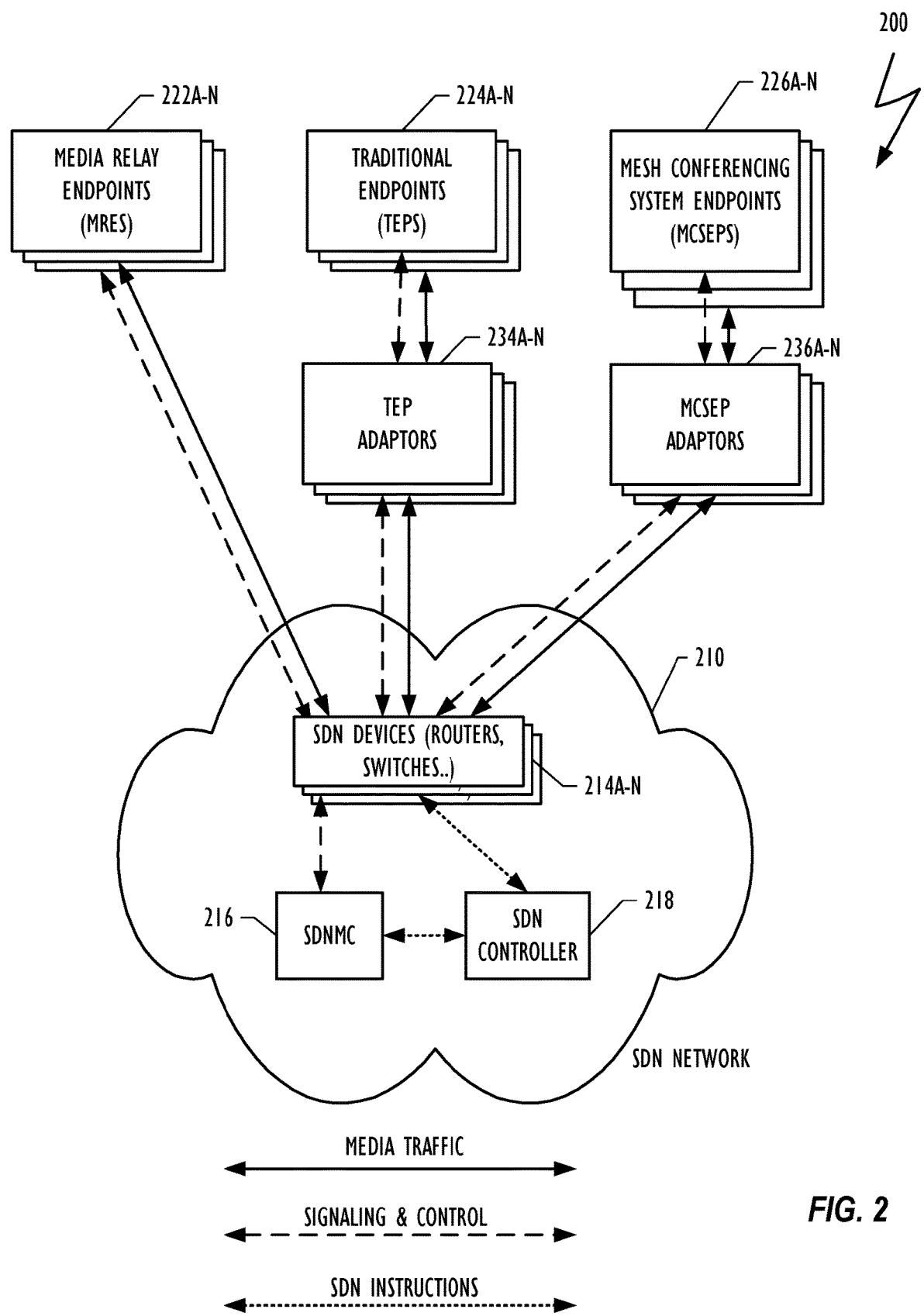
FIG. 2 is block diagram of an embodiment of a multimedia conferencing system based on an SDN environment.

FIG. 2 is block diagram of an embodiment of a multimedia conferencing system 200 based on an SDN environment. Unless otherwise specified, a multimedia conferencing system 200 based on an SDN environment may be interchanged and synonymous with the term MCSDN system 200. Recall from FIG. 1 that the multimedia conferencing network architecture 100 may comprise three abstraction planes, a multimedia conferencing abstraction plane 102, a control plane 104, and a data plane 106. The multimedia conferencing abstraction plane 102 portion can include the media, signaling and the control elements of the MCSDN system 200. Using FIG. 2 as an example, the multimedia conferencing abstraction plane portion 102 of the MCSDN system 200 may comprise SDNMC 216, one or more medial relay endpoints 222a-n, one or more TEPs 224a-n, and one or more MCSEPs 226a-n.

The SDNMC 216 can handle the control and the signaling of the multimedia conferencing session. The SDNMC 216 may also obtain an indication of the audio energy that is related to each of the transmitted audio from each of the endpoints, such as MREs 222a-n, TEPs 224a-n and MCSEPs 226a-n. Based on the audio energy (e.g., obtained from audio energy metadata), the SDNMC 216 may change the routing of the different audio and/or video streams as well as the relevant entries of the IPATT. In other embodiments, the SDNMC 216 may adapt the routing based on a user's request to view a particular media stream and/or a particular quality version of the media stream. After updating the routing information and entries in the IPATT, the SDNMC 216 may send instructions to an SDN controller 218 in order to reconfigure duplicating and routing of the data and update the signaling and control sent toward the appropriate endpoints 222a-n, 224a-n, and/or 226a-n.

In an embodiment of the MCSDN system 200 where TEPs 224a-n and/or MCSEPs 226a-n participate in the multimedia conferencing session, the MCSDN system 200 may include TEP adaptors 234a-n and/or MCSEP adaptors 236a-n, respectively. The MCSDN system 200 may allocate each TEP adaptor 234a-n to one or more TEP 224a-n and allocate each MCSEP adaptor 236a-n to one or more MCSEP 226a-n. The TEP adaptor 234a-n may translate the audio, video and other types of signaling associated with the TEP 224a-n to the MRC operations and vice versa. The MCSEP adaptor 236a-n may translate the audio, video and other types of signaling associated with the MCSEP 226a-n to the MRC operations and vice versa. In one embodiment, the MCSDN system 200 may dynamically allocate the TEP adaptor 234a-n and MCSEP 226a-n at a central premise. In another embodiment, the MCSDN system 200 may distribute the TEP adaptor 234a-n and MCSEP 226a-n within the relevant TEP 224a-n and MCSEPs 226a-n. The allocation of the network resources that the TEP adaptors 234a-n and MCSEP adaptors 236a-n utilize for translation between different endpoints may be implemented using SDN commands.

As shown in FIG. 2, instead of using customized hardware such as a TMCU or MRM, the MCSDN system 200 uses an SDN controller 218 within an SDN network 210 to duplicate and relay the signaling, media, and control of the multimedia conferencing session. In one embodiment, an SDN controller 218 may be a controller based on the "Open Daylight Project" software suite that transmits instructions to the SDN devices 214a-n using the OpenFlow protocol. An SDNMC 216 may comprise one or more APIs that translate and/or transform the relevant row of an updated IPATT for the SDN controller 218. In response to receiving the update IPATT, the SDN controller 218 adapts the switching and routing instructions of the SDN devices 214*a-n* to relay the appropriate streams toward the appropriate destination using a protocol, such as OpenFlow.

The SDN controller 218 may maintain an IPATT that associates media streams for each row of the table. The columns may comprise the media stream ID, the required QoS, the SDNMC requested source IP address and ports of the transmitting endpoint, and the one or more destination address of the endpoints that receive that stream. In embodiments in which a DPI server provides information relating to IPATT, the IPATT may also include a synchronization source (SSRC) field to identify the source of a media stream. The SDN controller 218 can parse the IPATT and the instructions and according to the possessed global view of the SDN network 210, the SDN controller 218 can transform the source and destination addresses and the required quality of each stream. In addition, the SDN controller 218 can duplicate routing and switching instructions received from the SDNMC 216 and transmit those instructions to each of the relevant SDN devices 214*a-n*.

FIG. 2 illustrates that the SDN network 210 within the MCSDN system 200 may comprise SDN devices 214*a-n* that transport the media conferencing traffic to and from the endpoints 222*a-n*; 224*a-n*; and 226*a-n* and the SDNMC 216. The SDN devices 214*a-n* include a variety of network devices, such as switches and routers, to perform the data plane functions. Each one of the SDN devices 214*a-n* can comply with the OpenFlow protocol or another or proprietary protocol and can comply with routing instructions obtained from the SDN controller 218. As shown in FIG. 2, each of the endpoints 222*a-n*; 224*a-n*; and 226*a-n* and the SDNMC 216 can send signaling and control information to inform the SDN network devices 214*a-n* about their IP addresses. The relevant SDN network devices 214*a-n* may include routers, switches, gateway, and/or gatekeepers that are communicatively coupled between the endpoints 222*a-n*; 224*a-n*; and 226*a-n* and the SDNMC 216.

The MCSDN system 200 can initiate a call flow when an endpoint 222*a-n*, 224*a-n*, and 226*a-n* that is associated with the multimedia conference makes a call, such as a SIP call, to the SDNMC 216. The destination address of the SIP call can reference the address that the SDNMC 216 advertised as a media address using a communication protocol, such as a session description protocol (SDP) offer and answer exchange. The media address, which the disclosure may also be referred to as the virtual media address, can be any combination of IP addresses and port addresses that the SDNMC 216 is eligible to allocate and maintain. After receiving the SIP call and authenticating the endpoint 222*a-n*, 224*a-n*, and 226*a-n*, the SDNMC 216 may send signaling and control instructions to the SDN controller 218 to handle the list of participants in the same multimedia conference as a group. The SDNMC 216 may also provide instructions to the SDN controller 218 to relay media streams from each of the parties directly to one or more other participants according to the multimedia conference dynamics. From time to time and according to the dynamics of the multimedia conferencing session, the SDNMC 216 can modify which participants in the list receive the media traffic. Example of dynamic changes of a multimedia conferencing session can include, but are not limited to speaker changes, new participants joining the session, and/or participants leaving the session.

In response, the SDN controller 218 can send southbound SDN instructions, such as OpenFlow commands, toward the SDN devices 214*a-n* that transport media traffic for the multimedia conference. The SDN instructions modify and update the routing tables on the relevant the SDN devices 214*a-n* to relay media traffic corresponding to the virtual media address directly to the other participants in the multimedia conference. Relay media traffic to the other participants may include duplicating the packets to the different destination as needed and changing the source address to the virtual media address. Such modification can lead each of the endpoints 222*a-n*, 224*a-n*, and 226*a-n* to believe that the endpoints 222*a-n*, 224*a-n*, and 226*a-n* are sending media traffic to the SDNMC 216 when allocating a virtual media address. The SDN network 210, however, has the SDN devices 214*a-n* use the virtual media address to relay the media to the conference participants based on instructions from the SDN controller 218. In other words, the endpoint 222*a-n*, 224*a-n*, and 226*a-n* may transmit and/or receive media streams via the SDN network devices 214*a-n* without sending the media streams to the SDNMC 216 and/or other centralized entity for processing.

The SDN controller 218 may also modify which media streams are sent to which participants and the network paths to transport the media streams according to changing conditions of the SDN network 210. For example, the SDN controller 218 may perform mid-call changes when attempting to resolve network congestion and other types network issues. The SDN controller 218 may receive network status information, such switching and routing queues, congestion state, amount of packet loss, and/or statistics about the discarded traffic, from one or more SDN devices 214*a-n* to detect network congestion and path failures. The SDN controller 218 may manage some of the network congestion and/or notify the SDNMC 216 of the network issues. For example, when the SDN controller 218 detects network congestion or path failure, the SDN controller 218 may implement an alternative media path and/or allocate network resources accordingly to alleviate the network issue. Additionally or alternatively, the SDN controller 218 may manage network congestion by temporarily stripping layers from the media stream by reducing the frame rate, resolution, and/or bit rate.

Although FIG. 2 illustrates a specific embodiment of a multimedia conferencing system 200, the disclosure is not limited to the specific embodiment illustrated in FIG. 2. For instance, embodiments of the present disclosure may include more than one SDN controller 218 within the SDN network 210 and other well-known types of endpoints besides MREs 222*a-n*, TEPs 224*a-n*, MCSEPs 226*a-n*. Furthermore, although FIG. 2 illustrates that the SDN controller 218 and the SDNMC 216 are separate computing systems, other embodiments of the multimedia conferencing system 200 may have the SDN controller 218, and the SDNMC 216 implemented using a single computing system. Additionally, the SDN network 210 may communicate with the endpoints based on communication protocols other than IP. The use and discussion of FIG. 2 is only an example to facilitate ease of description and explanation.

Figure 3:
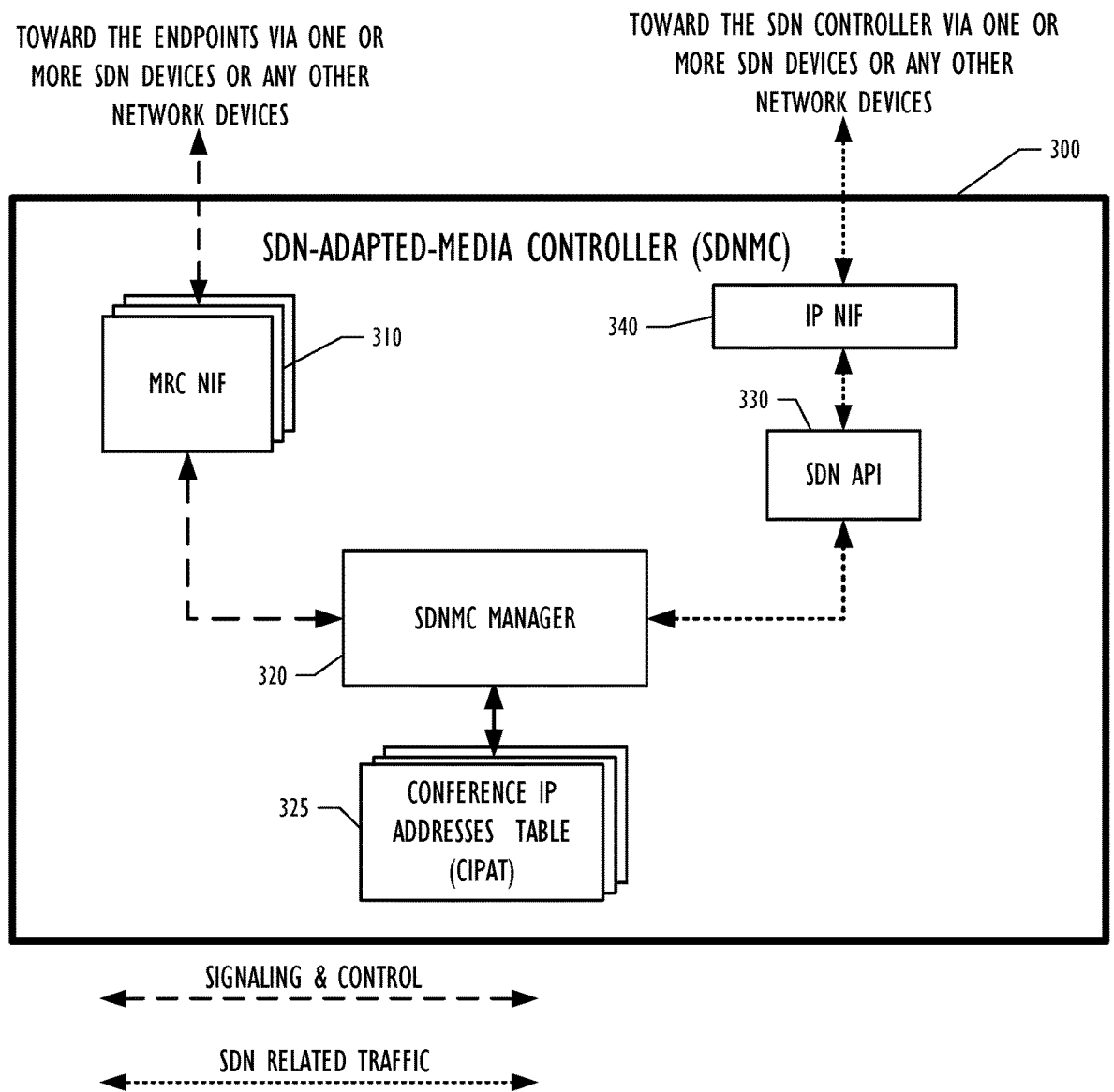
FIG. 3 illustrates a block diagram of an embodiment of an SDNMC.

FIG. 3 illustrates a block diagram of an embodiment of an SDNMC 300. As shown in FIG. 3, the SDNMC 300 may comprise one or more MRC network interfaces (NIF) 310; an SDNMC Manager 320; one or more conference-IP addresses table (CIPAT) 325; an SDN API 330, and an IP network interface (IP NIF) 340. Using FIG. 2 as an example, the MRC NIF 310 can be associated, via the one or more SDN devices 214*a-n*, with a MRE 222*a-n*. Other MRC NIFs 310 can be associated with a TEP 224*a-n* via a TEP adaptor 234*a-n* and a MCSEP 226*a-n* via an MCSEP adaptor 236*a-* n. The MRC NIF 310 can receive a media stream of data packets from SDN devices and/or other network devices and forward information within the data packets to the SDNMC manager 320.

In one embodiment, each MRC NIF 310 can obtain media streams in IP data packets that carry as payload, signaling and control information. In addition to common signaling and control information, the IP data packets include an indication regarding the audio energy that is associated with the obtained compressed audio. Each IP data packet received by the MRC NIF 310 can be processed according to the IP protocol. The signaling and control, as well as the indication about the audio energy (e.g., from audio energy metadata), can subsequently be delivered to the SDNMC Manager 320. In the other direction, the MRC NIF 310 can obtain from the SDNMC Manager 320 control and signaling information and transfer the information to the associated MRE 222a-n, TEP 224a-n via the relevant TEP adaptor 234a-n, and/or MCSEP 226a-n via the relevant adaptor 236a-n.

The SDNMC Manager 320 can perform management operations for the SDNMC 300. In one embodiment, in order to initiate a multimedia conference, the SDNMC Manager 320 can receive from an endpoint, such as MRE 222a-n, TEP 224a-n, and/or MCSEP 226a-n from FIG. 2, a request to establish a multimedia conferencing session that may also be referred to as dial-in conferee. For example, the SDNMC Manager 320 can receive the request from an endpoint via a common IP network. Additionally or alternatively, the SDNMC Manager 320 may also receive the request via the common IP network from a management server (not shown in FIG. 3) to establish a conferencing session between multiple endpoints, which may also be referenced as a dial-out conferee. The request can be associated with a list of dial numbers (a dial number can represent an IP addresses) to be used by the SDNMC 300 in order to establish a connection with those endpoints via one or more SDN devices or other network devices. Some multimedia conferencing sessions can comprise both dial in and dial out conferees. The SDNMC 300 may establish a connection with an endpoint by complying with well-known protocols for multimedia conferencing sessions, such as H.323 or SIP.

Upon initiation of the multimedia conferencing session, the SDNMC Manager 320 may learn the topology of a MCSDN system, such as MCSDN system 200 illustrated in FIG. 2. The SDNMC Manager 320 may learn the topology of the MCSDN system by configuring the SDN controller using a northbound API such as SDN API 330. The disclosure includes more detail within FIG. 4 regarding the establishing and managing the conferencing session by the SDNMC Manager 320.

Upon receiving a request to establish a multimedia conferencing session, the SDNMC manager 320 can create a CIPAT 325 for handing information to manage the multimedia conferencing session. The request can be associated with a list of two or more endpoints that will participate in the session. Based on the requested list of endpoints and knowing the topology of the MCSDN, the SDNMC manager 320, may create a CIPAT 325 that comprises information regarding the multimedia conferencing session. The information may comprise the media stream ID, IP addresses and ports of each of the media stream (e.g., video, audio or control and signaling), the required QoS, the allowed value of missing packets, and/or the maximum allowed latency. Based on the information stored in the relevant CIPAT 325, the SDNMC manager 320 may create a stream table.

The stream table can be transferred to the SDN API module 330 in order to share the stream table with one or more SDN controllers. The stream table can comprise information related to each media stream. The information may comprise source and destination IP addresses and ports, media stream ID number, QoS, and/or latency. Per each stream, the SDN API module 330 may process the relevant information and convert it into native SDN commands (multiplying, routing, switching, etc.). For some embodiments, a vendor of the relevant SDN network devices may provide the SDN API 330 modules. In other embodiments of SDNMC 300, the SDN API 330 can be a proprietary API. The SDNMC 300 can transfer directly the native SDN commands to the SDN controllers or via one or more SDN devices and/or other network devices using the IP NIF 340.

Although FIG. 3 illustrates a specific embodiment of an SDNMC 300, the disclosure is not limited to the specific embodiment illustrated FIG. 3. Although FIG. 3 illustrates that the SDNMC 300 include a separate MRC NIF 310 and IP NIF 340, other embodiments of the SDNMC 300 may combine the MRC NIF 310 and IP NIF 340. Additionally, other embodiments of the SDNMC 300 may embed the SDN API 330 within the SDNMC manager 320. In yet another embodiment, a single computing system may include both the SDNMC 300 and one or more SDN controllers. Similar to FIG. 2, the use and discussion of FIG. 3 is only an example to facilitate ease of description and explanation.

Figure 4:
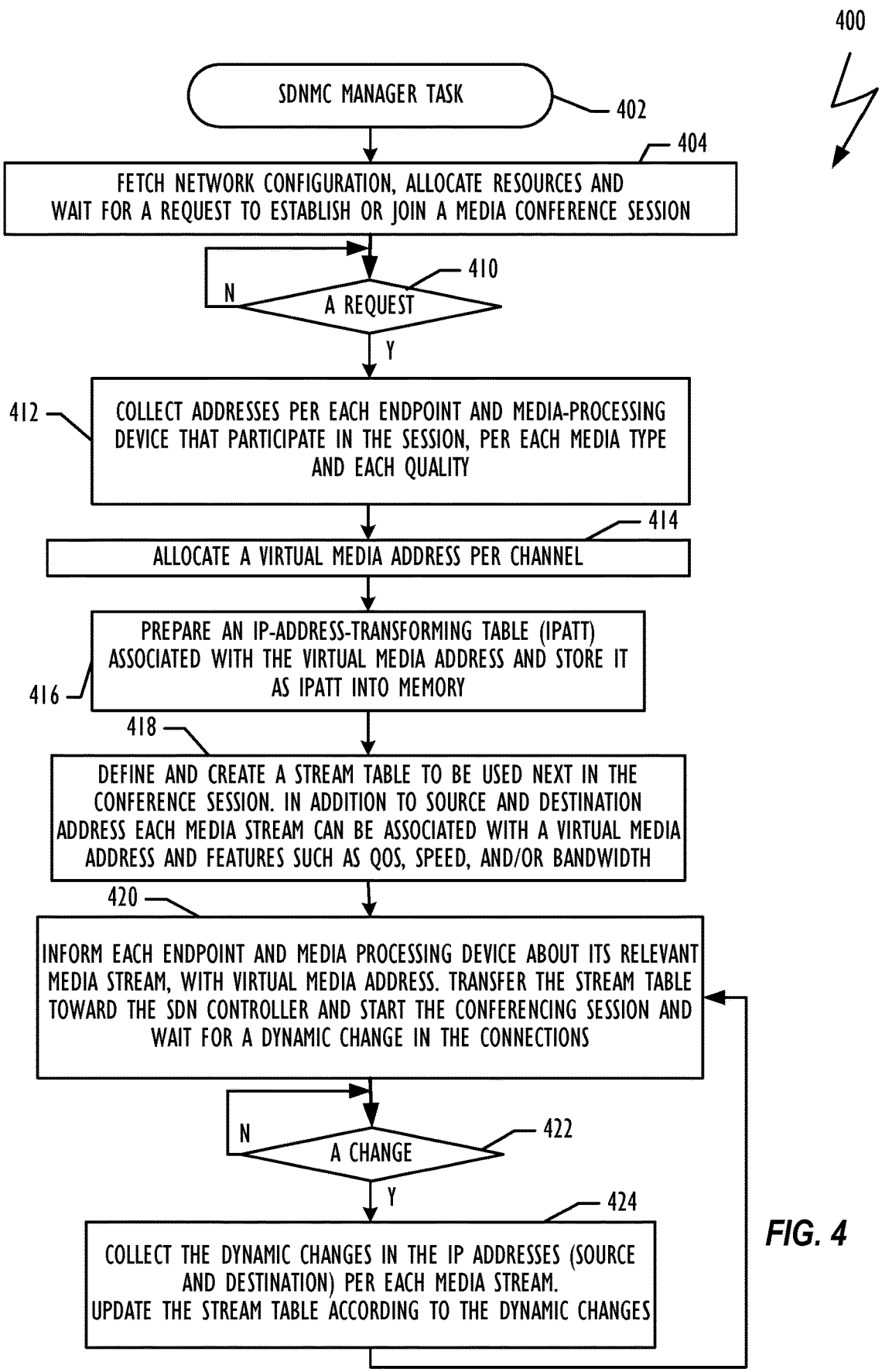
FIG. 4 illustrates a flowchart of an embodiment of a method for dynamically managing SDN network devices in a multimedia conferencing session.

FIG. 4 illustrates a flowchart of an embodiment of a method 400 for dynamically managing SDN network devices in a multimedia conferencing session. Using FIGS. 1 and 2 as an example, method 400 may be implemented using multimedia conferencing network architecture 100 and/or MCSDN system 200. Additionally or alternatively, method 400 may be implemented using the SDNMC 300 as shown in FIG. 3. Method 400 can be initiated to start an SDNMC manager task at block 402. For example, method 400 may start an SDNMC manager task upon the initiation of the SDNMC. After initiation, method 400 may move to block 404 and fetch network configuration information and allocate resources, such as internal resources of the SDNMC. Once method 400 receives network configuration information and allocates resources, method 400 may wait for a request to establish or join a multimedia conferencing session, such as a VMR.

At block 410, method 400 may determine whether it has receive a request to establish or join a multimedia conferencing session. For example, method 400 may wait to obtain a request from an endpoint to establish a multimedia conferencing session. The request can be associated with a list of participants at other endpoints. In one embodiment, a VMR can represent the multimedia conferencing session, which can be accessed with or without a password. The VMR may be associated with a VMRID and have a URL or URI. Recall that a VMR may comprise a list of endpoints already connected to the VMR. In the list, each endpoint is associated with one or more URLs that allow other participants to contact the VMR. Each URL can be associated with a media type or signaling. Upon receiving a request to establish a multimedia conferencing session, the method 400 may move to block 412 to collect addresses, such as the source and destination IP addresses, for each listed endpoint and media-processing device (e.g., TEP adaptors and MCSEP adaptors) that participates in the multimedia conferencing session according to each media type and each media stream quality.

At block 414, method 400 can allocate a virtual media address per each channel of that multimedia conferencing session. The virtual media address may represent an address of the SDNMC that the SDN devices use for multiplying, routing, and switching media streams on the channel. The virtual media address, can be any combination of IP addresses and port addresses that the SDNMC is eligible to allocate and maintain. The method 400 may then move to block 416 and for each channel, prepare an IPATT associated with the virtual media address and store the IPATT into memory. In an embodiment of the IPATT, each row of the table can be associated with a media stream. The columns may comprise the stream ID and/or the virtual media address, the required QoS, the IP addresses of the transmitting endpoint as requested by the MC, and the one or more destination address of the endpoints that receive the media stream. In some embodiments, method 400 may use a DPI module to collect the information needed for the IPATT information. Additionally, each of the endpoints and the SDNMC may inform the relevant SDN devices about their IP addresses. The relevant network devices may comprise routers, switches, gateway, and/or gatekeepers that are communicatively coupled to the endpoints and the SDNMCs.

At block 418, method 400 may define and create a stream table, per each session. The stream table can follow the dynamic variation of the multimedia conferencing session cause from a variety of factor, such as speaker changes, a new participant joins the session, and/or a participant leaves the session. Additionally, each media stream can be associated with not only source and destination addresses, but also with the virtual media address and network features, such as QoS, speed, and/or bandwidth. Method 400 may then move to block 420 to inform each endpoint and/or media processing device about the media streams that are relevant to that conferencing device. The information may comprise the virtual media address allocated to the media stream. Using FIG. 3 as an example, MRC NIF 310 may inform the multimedia conferencing devices. Method 400 at block 420 may transfer the stream table to the SDN controller to configure the appropriate network configuration, connections between the multimedia conferencing devices, and delivers SDN routing, multiplying, and switching commands to the SDN devices.

At this point, method 400 may have configured the network for handling the multimedia conferencing session. In one embodiment, the SDNMC may receive an SDN-ready indication instructing the SDNMC to start the multimedia conferencing session. Once method 400 starts the multimedia conferencing session, method 400 may move to block 422 and wait for dynamic changes to the session. A dynamic change at block 422 can include adding a participant, a participant leaving a session, the end of session, and/or changes in speaker. In response to a dynamic change, the method 400 may proceed to block 424 to collect information, such as IP addresses for each media stream relating to the dynamic change and determine how the change affects the stream table. Method 400 may modify the stream table in order to reflect the dynamic change. After updating the stream table in block 424, method 400 may return to block 420 in order to configure the SDN network based on the dynamic change. Method 400 can terminate at the end of the multimedia conferencing session.

Figure 5:
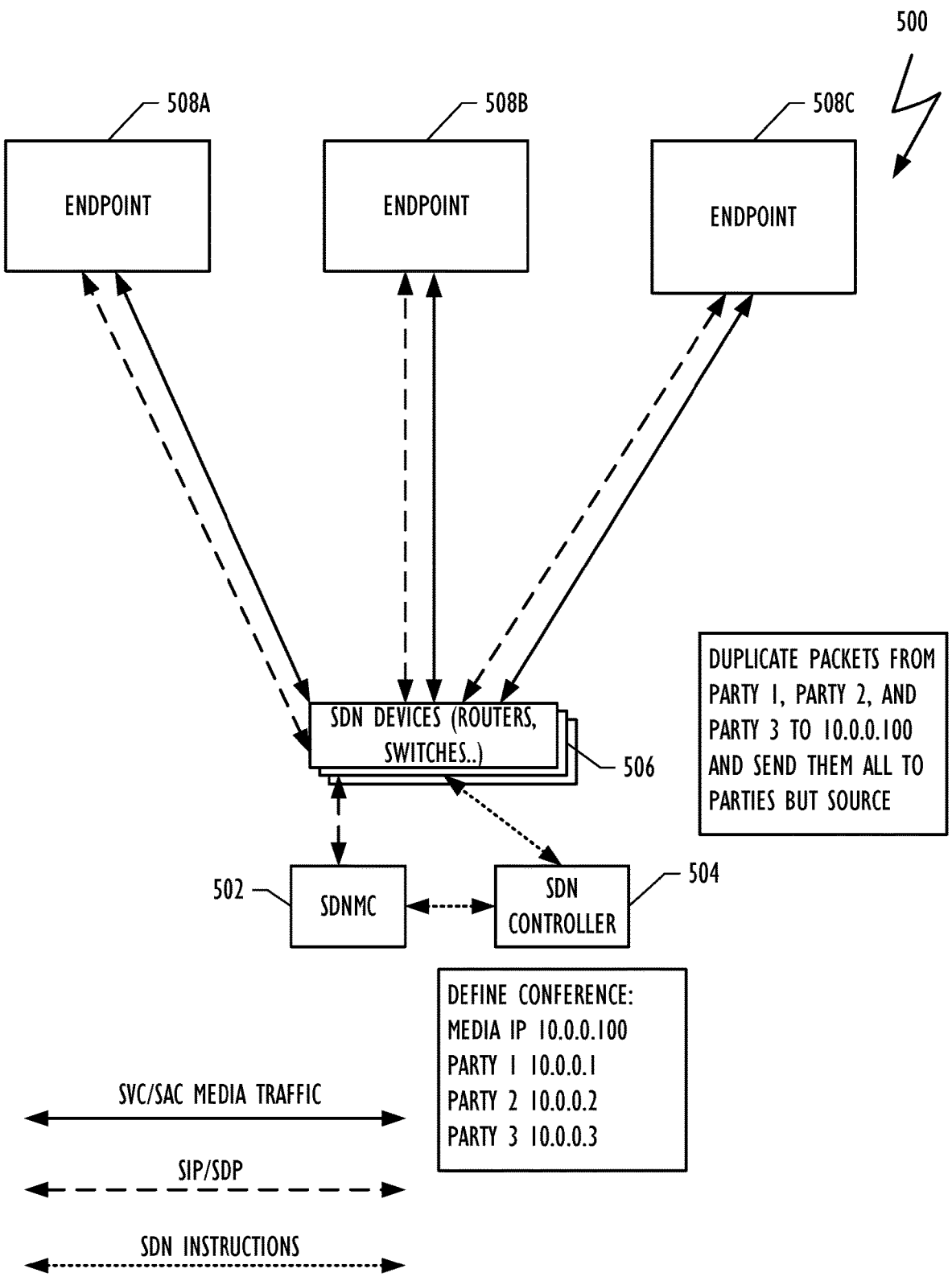
FIG. 5 is block diagram of an embodiment of a multimedia conferencing SDN (MCSDN) system that includes endpoints that use the same media conferencing method.

FIG. 5 is block diagram of an embodiment of a MCSDN system 500 that includes endpoints 508a-c that use the same media conferencing method (e.g., MRC). In other words, the MCSDN system 500 is media conference in which all of the endpoints 508a-c associated with the MCSDN system 500 are using the same media conferencing method. Because the different endpoints 508a-c use the same media conferencing method, the endpoints 508a-c may relay media without an adaptor that acts as a transcoding entity. Using FIG. 2 as an example, endpoints 508a-c may perform MRC, such as the MREs 222a-n. The SDNMC 502, SDN controller 504, and SDN device 506 may perform substantially similar operations as the SDNMC 216, SDN controller 218, and SDN devices 214a-n described in FIG. 2, respectively.

To implement a call flow using the MCSDN system 500, each of the endpoints 508a-c in a multimedia conference may transmit a SIP call to the SDNMC 502. After receiving the SIP calls from the endpoints 508a-c, the SDNMC 502 may advertise a virtual media address in the SDP Offer/Answer exchange. As shown in FIG. 5, the SDNMC 502 may advertise the virtual media address 10.0.0.100 after receiving the SIP call. The SDNMC 502 may also instruct the SDN controller 504 to handle a list of participants in the same media conference as a group and to relay the media streams from all of the participants in the group to each other. FIG. 5 depicts that the instructions define the multimedia conference by including the virtual media address and the network addresses of the different endpoints (e.g., 10.0.0.1, 10.0.0.2, and 10.0.0.3).

Once the SDN controller 504 receives the instructions, the SDN controller 504 may send SDN commands to the SDN device 506 that is part of the multimedia conference. The SDN commands may duplicate routing and switching instructions received from the SDNMC 502 in order to update the routing tables that relay media streams sent from between the endpoints 508a-c. As shown in FIG. 5, the endpoints 508a-c may directly send media streams to other endpoints 508a-c using a scalable video coding (SVC) and/or a scalable audio coding (SAC) protocol by including the virtual media address. The SDNMC 502 may subsequently communicate modifications to the SDN controller 504 when dynamic changes occur within the multimedia conference. For example, the SDNMC 502 may communicate changes when a speaker change and/or a participating joins and/or leaves a multimedia conference session.

Figure 6:
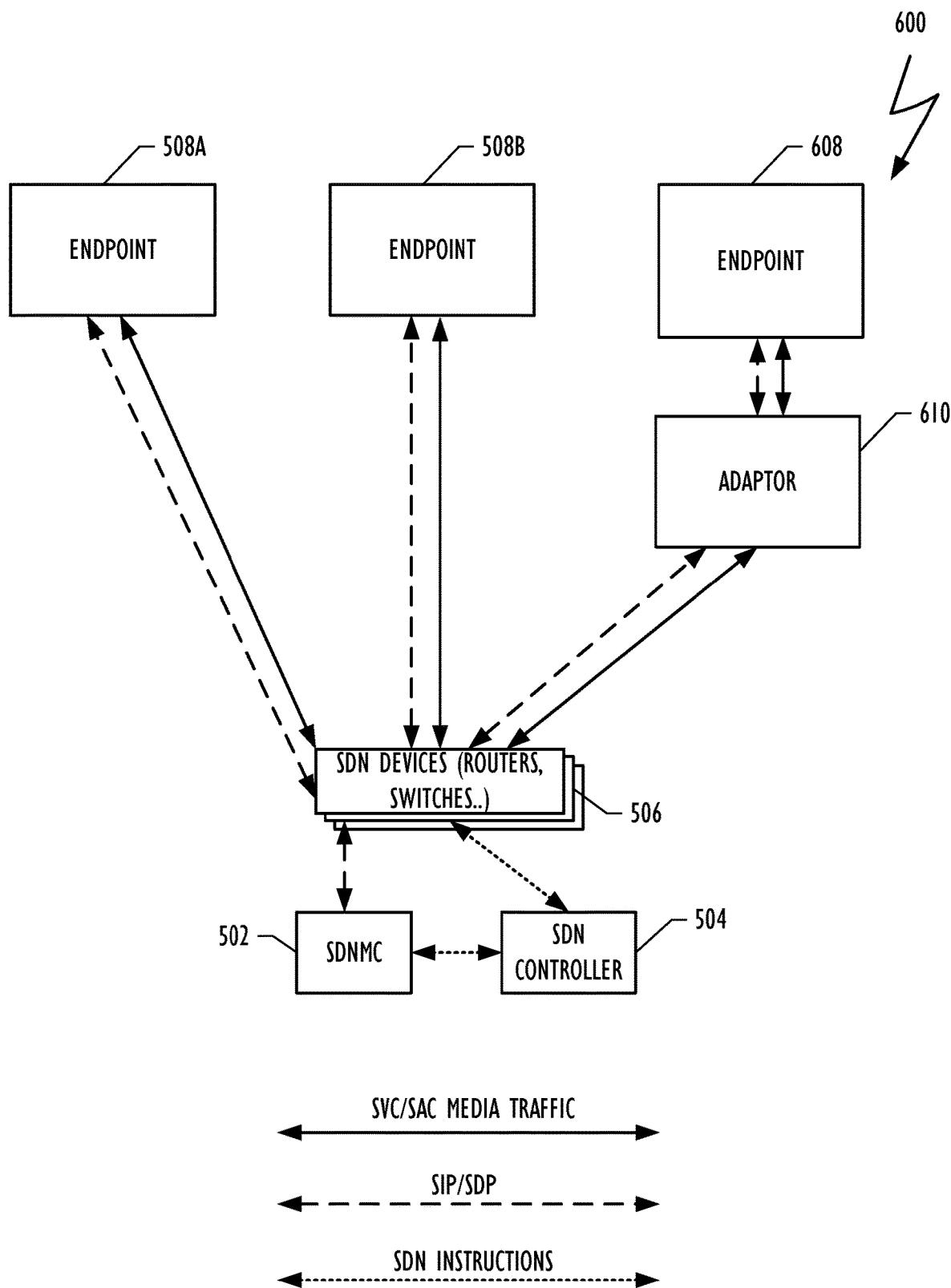
FIG. 6 is block diagram of an embodiment of a MCSDN system that includes endpoints that uses a single different media conferencing method.

FIG. 6 is block diagram of an embodiment of a MCSDN system 600 that includes endpoints 608 that uses one different media conferencing method (e.g., AVC media conferencing method). In FIG. 6, the MCSDN system 600 includes an adaptor 610 that translates the media and signaling for media streams that endpoint 608 transmits and/or receives to and/or from other endpoints 508a and 508b. By including the adaptor 610, the SDNMC 502 may view the behavior of endpoint 608 as the same as the other endpoints 508a and 508b. For example, when the adaptor 610 receives media streams from endpoints 508a and 508b, the adaptor 610 may translate the media streams to media conferencing method used by the endpoint 608 (e.g., AVC or MC S). The adaptor 610 may also be able to connect to other multimedia platforms and/or APIs, such as WebRTC. Additionally, the adaptor 610 may perform encryption and/or decryption of media streams and implement one or more Network Address Translation (NAT) protocols, such as Session Traversal Utilities for NAT (STUN), Interactive Connectivity Establishment (ICE), and/or Traversal Using Relay NAT (TURN).

Figure 7:
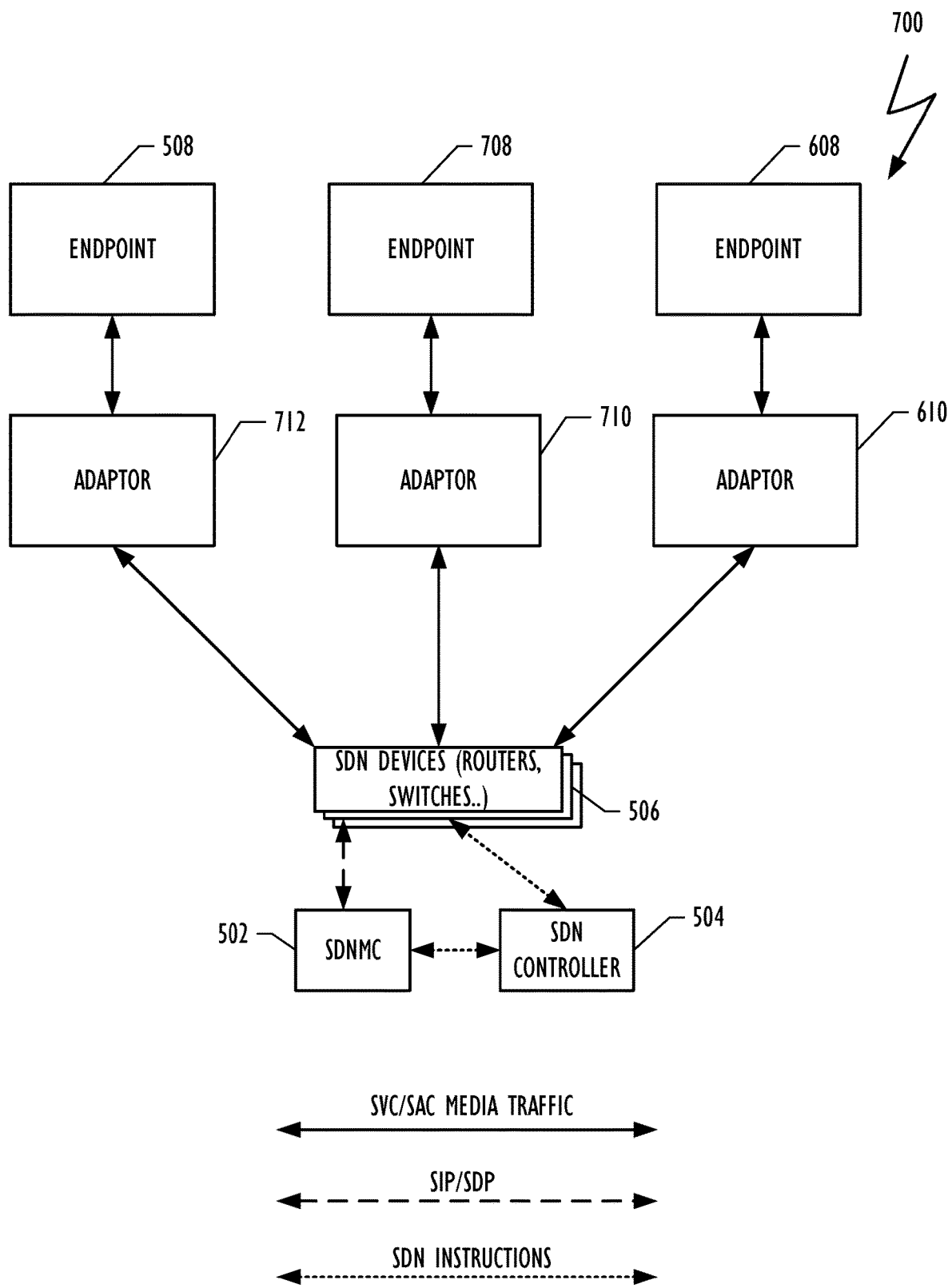
FIG. 7 is block diagram of an embodiment of a MCSDN system that use multiple different media conferencing methods.

FIG. 7 is block diagram of an embodiment of a MCSDN system 700 that use multiple different media conferencing methods (e.g., AVC and MCS). Endpoints 608 and 708 do not support the relay conferencing technology implemented by the SDNMC 502 and endpoint 508. In contrast to the MCSDN system 600, the adaptors 610, 710, and 712 transmit media streams in their native format to the virtual media address. When the other adaptors 610, 710, and 712 receive the media streams encoded in a format not supported by the associated endpoint 508, 608, and 708, each of the adaptors 610, 710, and 712 may then translate the media streams for the associated endpoints 508, 608, and 708. For example, if endpoint 608 sends a media stream to endpoint 508, adaptor 610 does not translate or convert the media stream. Instead, the adaptor 610 sends the media stream in the native format (e.g., AVC media conferencing method) to adaptor 712. Once adaptor 712 receives the media stream, the adaptor 712 may convert the media stream from the native format (e.g., AVC media conferencing method) to a format supported by the endpoint 508 (e.g., MRC media conferencing method). In FIG. 7, adaptor 610 is associated with and performs media stream translation for endpoint 608, adaptor 712 is associated with and performs media stream translation for endpoint 508, and adaptor 710 is associated with and performs media stream translation for endpoint 708.

Figure 8:
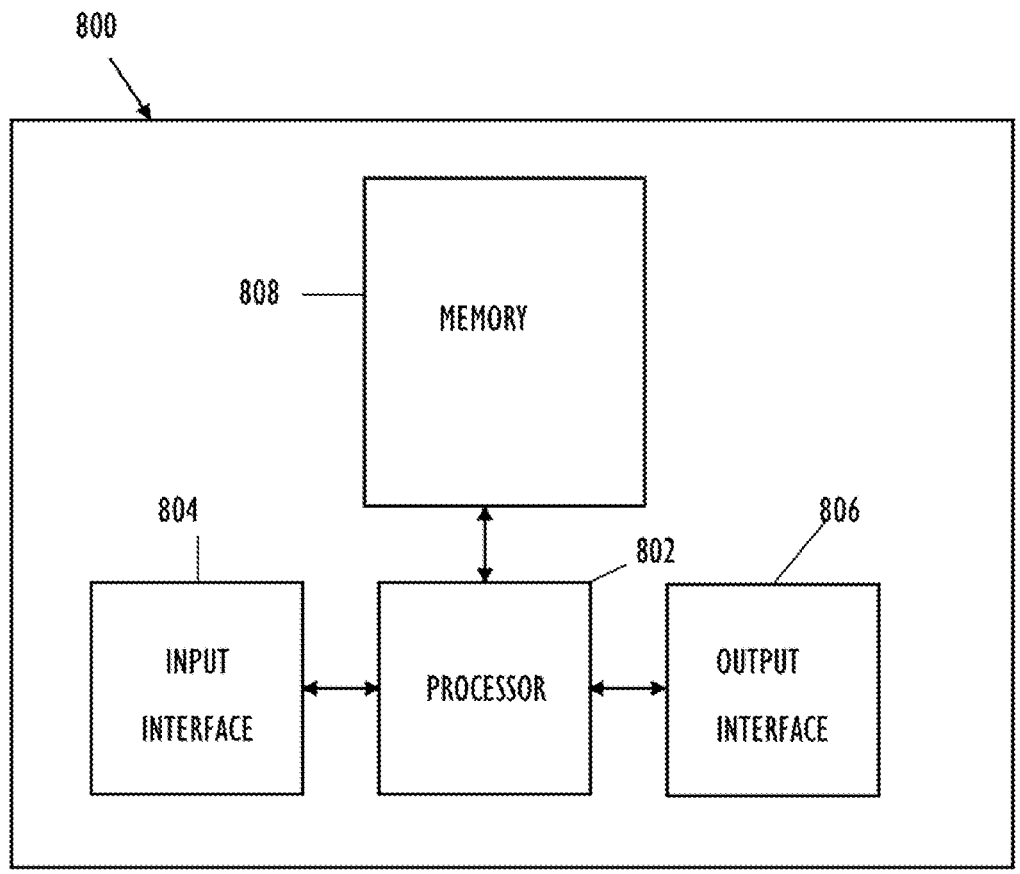
FIG. 8 is a schematic diagram of an embodiment of a programmable device for use with techniques described herein.

FIG. 8 is a schematic diagram of an embodiment of a programmable device 800 that may correspond to or may be part of a computer and/or any other computing device, such as a workstation, server, mainframe, super computer, and/or portable computing device. Using FIG. 2 as an example, the programmable device 800 may be part of the SDN controller 218, SDNMC 216, and/or adaptors 234a-n and 236a-n as described in FIG. 2. The programmable device 800 may comprise a processor 802, which may be also be referenced as a central processor unit (CPU). The processor 802 may communicate (e.g., via a system bus) and/or provide instructions to other components within the programmable device 800, such as the input interface 804, output interface 806, and/or memory 808. In one embodiment, the processor 802 may comprise one or more multi-core processors and/or memory mediums (e.g., cache memory) that function as buffers and/or storage for data. Additionally, processor 802 may be part of one or more other processing components, such as application specific integrated circuits (ASICs), field-programmable gate arrays (FPGAs), and/or digital signal processors (DSPs). Although FIG. 8 illustrates that processor 802 may be a single processor, processor 802 is not so limited and instead may represent a plurality of processors. The processor 802 may be configured to implement any of the methods described herein, which include method 400 as described in FIG. 4.

FIG. 8 illustrates that memory 808 may be operatively coupled to processor 802. Memory 808 may be a non-transitory medium configured to store various types of data. For example, memory 808 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 8, the memory 808 may be used to house the instructions for carrying out various embodiments described herein. In an embodiment, the memory 808 may comprise instructions for implementing the SDNMC 216 as shown in FIG. 2. Alternatively, the memory 808 may comprise instructions for implementing the SDN controller 218 as described in FIG. 2. In one embodiment, memory 808 may interface with a system bus (e.g., a computer bus) so as to communicate and/or transmit information stored in memory 808 to processor 802 during execution of software programs, such as software applications that comprise program code, and/or computer executable process steps that incorporate functionality described herein (e.g., method 400).

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a machine, processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or other application specific hardware that hardwires the instructions or process steps of the software. In the same manner as a machine controlled by a new ASIC is a non-generic, particular, specially programmed machine or apparatus, likewise a computing device (e.g., a computer) that has been programmed and/or loaded with executable instructions or process steps (e.g., method 400) should be viewed as a non-generic, particular, specially programmed machine or apparatus.

FIG. 8 also illustrates that the processor 802 may be operatively coupled to an input interface 804 configured to receive media streams, and output interface 806 configured to output media streams. The input interface 804 may be configured to obtain the media streams via cables, connectors, wireless connections and/or other communication protocols. In one embodiment, the input interface 804 may be a network interface that comprises a plurality of ports configured to receive and/or transmit data via a network. In particular, the network interface may transmit the seismic data via wired links, wireless link, and/or logical links. Other examples of the input interface 804 may be universal serial bus (USB) interfaces, CD-ROMs, DVD-ROMs and/or connections to one or more seismic receivers. The output interface 806 may include, but is not limited to one or more connections for a graphic display (e.g., monitors), a printing device that produces hard-copies of the generated results, and/or a plurality of ports that transmit data via cables, connectors, wireless connections, and/or other communication protocols.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

What is claimed is:

1. A software defined network (SDN)-adapted media controller (SDNMC), comprising:
   a first network interface configured to receive a request to establish a multimedia conferencing session between a plurality of endpoints;
   an SDNMC manager coupled to the first network interface, the SDNMC manager configured to:
   allocate at least one virtual media address for the multimedia conferencing session advertised by the SDNMC; and
   create media session information for the multimedia conferencing session based on the at least one virtual media address; and
   a second network interface coupled to the SDNMC manager, the second network interface configured to transmit one or more SDN commands to an SDN controller, the one or more SDN commands including the media session information,
   wherein the media session information allows for routing media traffic corresponding to the virtual media address directly between the endpoints.

2. The SDNMC of claim 1, further comprising an SDN module configured to convert the at least one virtual media address and the media session information into the one or more SDN commands.

3. The SDNMC of claim 1, wherein the media session information is located within a stream table that comprises a source and a destination address and port information for the multimedia conferencing session, and wherein the stream table further comprises a media stream identifier, quality of service information, and latency information for the multimedia conferencing session.

4. The SDNMC of claim 3, wherein the SDNMC manager is further configured to create the stream table from a conference Internet Protocol (IP) addresses table stored within the SDNMC.

5. The SDNMC of claim 1, wherein the SDNMC manager is further configured to prevent routing of media streams to one or more unauthenticated endpoints.

6. The SDNMC of claim 1, wherein the first network interface is further configured to receive the request to establish the multimedia conferencing session between the endpoints from a translator adaptor associated with one of the endpoints.

7. A machine readable memory on which instructions are stored, comprising instructions that when executed cause a machine to:
   receive a request to establish a multimedia conferencing session between a plurality of endpoints;
   allocate at least one virtual media address for the multimedia conferencing session advertised to the endpoints and
   create a stream table based on the at least one virtual media address, wherein the stream table comprises media session information relating to the multimedia conferencing session; and
   transmit one or more software defined networking (SDN) commands that includes the stream table to an SDN controller,
   wherein the stream table allows for routing media traffic corresponding to the virtual media address directly between the endpoints via one or more SDN-complaint network devices.

8. The machine readable memory of claim 7, wherein the instructions, when executed, causes the machine to convert the at least one virtual media address and the stream table into the one or more SDN commands.

9. The machine readable memory of claim 7, wherein the stream table comprises a media stream identifier, quality of service information, and latency information for the multimedia conferencing session.

10. The machine readable memory of claim 7, wherein the instructions to create the stream table based on the at least one virtual media address comprises instructions, further comprise instructions that, when executed cause the machine to create the stream table from a conference Internet Protocol (IP) addresses table obtained from a deep packet inspection server.

11. The machine readable memory of claim 7, wherein the instructions to receive the request to establish the multimedia conferencing session comprises instructions to receive the request to establish the establish the multimedia conferencing session between the endpoints from a translator adaptor associated with one of the endpoints.

12. A system comprising:
   a software defined network (SDN)-adapted media controller (SDNMC); and
   an SDN controller communicatively coupled to the SDNMC,
   wherein the SDNMC is configured to:
   receive a request to establish a multimedia conferencing session between a plurality of endpoints;
   allocate at least one virtual media address for the multimedia conferencing session advertised to the endpoints; and
   create a stream table based on the at least one virtual media address, wherein the stream table comprises media session information relating to the multimedia conferencing session; and transmit one or more SDN commands that includes the stream table to the SDN controller, and wherein the SDN controller is configured to:
receive the SDN commands at a northbound interface; and
send one or more SDN instructions based on the SDN commands to one or more SDN devices at a southbound interface, wherein the SDN instructions include routing information that relays media traffic corresponding to the virtual media address directly to between the endpoints.

13. The system of claim 12, wherein the stream table comprises a media stream identifier, quality of service information, and latency information for the multimedia conferencing session.

14. The system of claim 12, wherein the SDN controller is further configured to:
receive network status information from one or more of the SDN devices; and
resolve network congestion determined from the network status information during the multimedia conferencing session.

15. The system of claim 12, wherein the SDN controller is further configured to cause the duplication of media traffic corresponding to the virtual media address from a source endpoint to each of the destination endpoints.

* * * * *